US010250030B2

(12) United States Patent
Newell et al.

(10) Patent No.: US 10,250,030 B2
(45) Date of Patent: *Apr. 2, 2019

(54) POWER DISTRIBUTION UNIT WITH MODULAR CHARGING PORTS

(71) Applicant: Core Brands, LLC, Petaluma, CA (US)

(72) Inventors: Steven H. Newell, Petaluma, CA (US); Gerald B. Hoopes, Petaluma, CA (US)

(73) Assignee: Core Brands, LLC, Petaluma, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,841

(22) Filed: Dec. 4, 2017

(65) Prior Publication Data
US 2018/0090926 A1    Mar. 29, 2018

Related U.S. Application Data

(63) Continuation of application No. 14/644,765, filed on Mar. 11, 2015, now Pat. No. 9,837,813.

(60) Provisional application No. 61/954,239, filed on Mar. 17, 2014.

(51) Int. Cl.
*H02B 1/48* (2006.01)
*H02B 1/52* (2006.01)
*H02H 7/22* (2006.01)
*H01R 31/06* (2006.01)
*H01R 25/00* (2006.01)
*H01R 27/02* (2006.01)
*H01R 31/00* (2006.01)

(52) U.S. Cl.
CPC ............. *H02H 7/22* (2013.01); *H01R 31/065* (2013.01); *H02B 1/48* (2013.01); *H02B 1/52* (2013.01); *H02H 7/228* (2013.01); *H01R 25/003* (2013.01); *H01R 27/02* (2013.01); *H01R 31/005* (2013.01)

(58) Field of Classification Search
CPC ............................. H02H 9/042; H02H 9/005
See application file for complete search history.

(56) References Cited

U.S. PATENT DOCUMENTS 9,837,813 B2* 12/2017 Newell ................... H02H 7/22
2010/0213892 A1* 8/2010 DeSanctis ............ H01R 25/006
                                                                320/107
2011/0062780 A1* 3/2011 Verges ................. H02J 13/001
                                                                307/38
2012/0276763 A1  11/2012 Quezada
(Continued)

OTHER PUBLICATIONS

"U.S. Appl. No. 14/644,765, Notice of Allowance dated Aug. 7, 2017", 11 pgs.

*Primary Examiner* — Dharti H Patel
(74) *Attorney, Agent, or Firm* — Schwegman Lundberg & Woessner, P.A.

(57) ABSTRACT

A surge protector for providing electricity to an electronic device. The surge protector including a housing defining a module slot and including a module connector positioned within the module slot and a module insertable into the module slot and including at least one connector port and a housing connector. The housing connector can be operably connectable to the module connector when the module is inserted into the module slot. The cable can be connected to the module and housing such that the module can be positioned at a location remote from the housing.

18 Claims, 7 Drawing Sheets

(56) References Cited

U.S. PATENT DOCUMENTS

| | | | |
|---|---|---|---|
| 2015/0236459 A1* | 8/2015 | Lee | H01R 25/003 439/652 |
| 2015/0263513 A1 | 9/2015 | Newell et al. | |
| 2015/0333455 A1 | 11/2015 | Chiang | |
| 2016/0070282 A1 | 3/2016 | Chapel et al. | |

* cited by examiner

POWER DISTRIBUTION UNIT WITH MODULAR CHARGING PORTS

CLAIM OF PRIORITY

This patent application in a continuation of Newell et al. U.S. patent application Ser. No. 14/644,765, entitled "POWER DISTRIBUTION UNIT WITH MODULAR CHARGING PORTS," filed on Mar. 11, 2015, which claims the benefit of priority, under 35 U.S.C. Section 119(e), to Newell et al. U.S. Patent Application Ser. No. 61/954,239, entitled "POWER DISTRIBUTION UNIT WITH MODULAR CHARGING PORTS," filed on Mar. 17, 2014, each of which are hereby incorporated by reference herein in their entirety.

TECHNICAL FIELD

This document pertains to power distribution devices capable of distributing power among a plurality of electronic devices.

BACKGROUND

Power Distribution Units (PDUs) are power supply devices that operably connect any number of electronic devices to an electrical outlet to supply electricity for the electronic devices. A surge protector is a type of power distribution unit that typically has power conditioning circuitry for voltage limiting that limits the amplitude of the supplied electricity to the electronic device from the wall outlet if an irregularity in the electricity supplied by the wall outlet, such as a power surge, is experienced. As irregularities in the supplied electricity can damage the connected electronic device(s), the power conditioning circuitry prevents the irregular electricity from reaching the electronic device(s) and causing damage.

Power distribution units often include multiple AC power sockets, each connectable to an AC power plug of an electronic device to operably link the electronic device to an electrical outlet. The plurality power sockets allow multiple electronic devices to be connected to a wall outlet via an integrated surge protector, such that the electronic devices are all protected from irregularities in the supplied electricity. The plurality of power sockets also provides the additional benefit of allowing multiple electronic devices to be connected to a single power outlet, which often include only one or two power sockets. While the multiple power sockets advantageously allow multiple electronic devices to be connected to a single surge protector, the size of the surge protector is substantially increased to provide sufficient space for the power sockets. In particular, certain surge protectors are sized to receive the large transformers integrated into power plugs of certain electronic devices without blocking adjacent power sockets. The relatively large size of surge protectors having multiple power sockets often causes the surge protector to be placed on the ground adjacent the electrical outlet to conceal the large protector for aesthetic or practical reasons. In addition, the power plugs and the corresponding power cords of the electronic devices connected to the surge protectors can have unpleasing aesthetic appearance also causing the surge protector to be placed on the ground or behind a furniture item to conceal the unpleasant aesthetic appearance.

Certain surge protectors includes serial connectors, telephone connectors and/or USB connectors for connecting electronic devices that are linked to power supplies through connectors other than power plugs. These electronic connectors are often dual purpose connectors capable of transmitting information as well as electricity to the device. Electronic devices having these alternative connectors, such as USB devices, are often frequently disconnected from the corresponding connector and reconnected or connected to different connectors in the ordinary use of the electronic device. However, as surge protectors are typically placed on the ground and/or concealed behind a furniture item due to the size and the aesthetic appearance of the connected power plugs and cords, reaching the surge protector to disconnect or reconnect the connector to the surge protector can be tedious and difficult.

OVERVIEW

The present inventor has recognized, among other things, that a problem to be solved can include the tradeoff between providing sufficient power outlets in a single surge protector for multiple electronic devices and positioning the often bulky surge protector for convenient access to the power outlets. In an example, the present subject matter can provide a solution to this problem, such as by providing a module that can have a connector port and can be removed from the housing of the surge protector such that the module can be positioned remotely from the housing for convenient access to the connector port. A power plug that can be connected to a wall outlet can also be operably connected to power distribution circuitry positioned within the housing to supply electricity to the housing from a wall outlet. The module can be tethered to the housing by a removable cable or include an independent power source to supply electricity to electronic devices attached to the connector port.

In an example, the surge protector can include at least one module and a housing defining a module slot for receiving the module. The module can include at least one connector port such, as a USB port, for connecting an electronic device to the module. In certain examples, the surge protector can include at least one fixed power socket positioned on the housing. The module can include a housing connector for interfacing with a module connector positioned in the housing slot when the module is positioned within module slot. In this configuration, the module can operate in the same manner as the fixed power sockets of the housing. The module can be removed from the slot and positioned at a location remote from the housing such as on desk or other more accessible locations. The module can have be smaller and less obtrusive or more aesthetically appealing appearance than the larger housing. The module can be tethered to the housing by a removable cable or include an independent power source to supply electricity to electronic devices attached to the connector port. In this configuration, the module can effectively operate as a remote and more easily accessible connector to which electronic devices can be connected. Similarly, the housing and the fixed power outlets can function as a conventional surge protector providing a plurality of power outlets for electronic devices that do not require convenient access to the power outlets.

In an example, the module can include a secondary housing connector to which the cable can be connected to link the module to the module connector of the housing. In another example, the housing can similarly include a secondary module connector in which the connector extends between the secondary housing connector and the secondary module connector.

In an example, each module can include a keyed protrusion that interfaces with a corresponding keyed slot positioned within the module slot. The keyed protrusion can prevent a module from being inserted into the wrong module slot.

This overview is intended to provide an overview of subject matter of the present patent application. It is not intended to provide an exclusive or exhaustive explanation of the subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
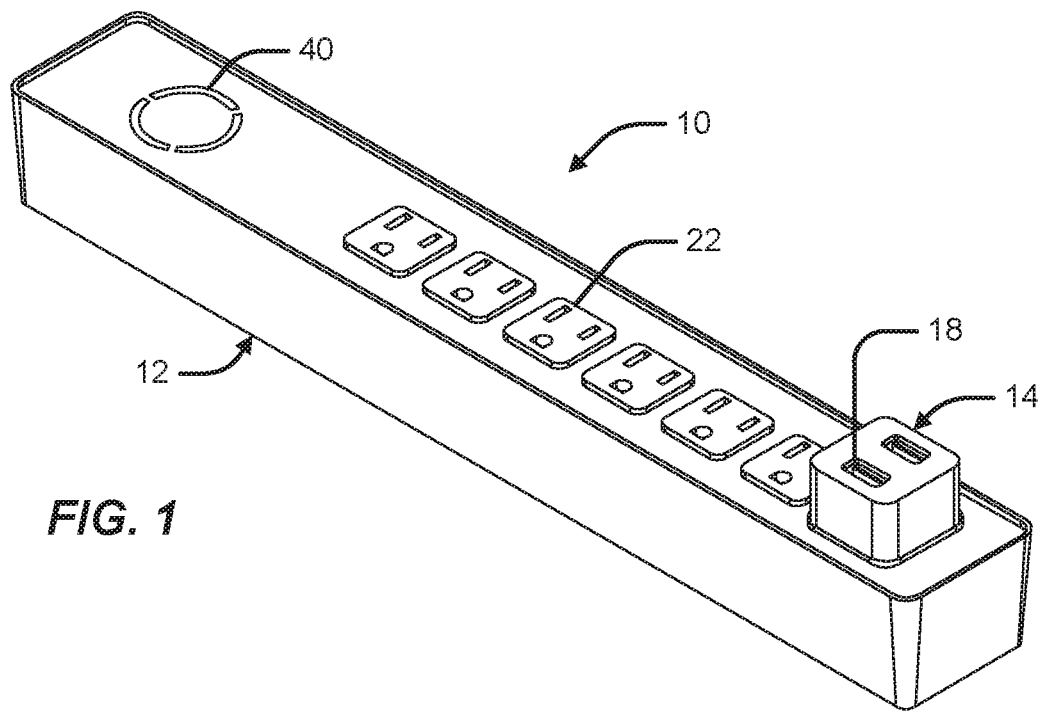
FIG. 1 is a perspective view of a surge protector having a housing for receiving a removable module according to an example in which the module is attached to the housing.
Figure 2:
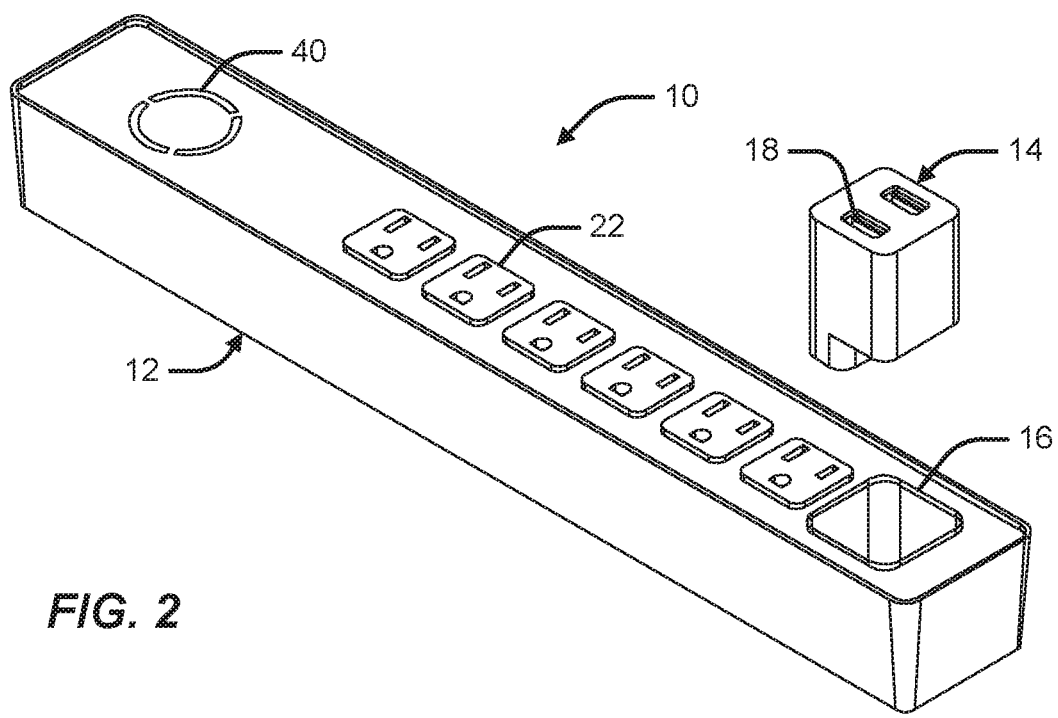
FIG. 2 is a perspective view of a surge protector having a housing for receiving a removable module according to an example in which the module is detached from the housing.

As depicted in FIGS. 1-3, a power distribution unit 10, according to an example, includes a housing 12 and at least one module 14. The housing 12 defines at least one module slot 16 for receiving the module 14 to operably engage the module 14 to the housing 12. Each module 14 is removable from the module slot 16 to position the module 14 at a position remote from the housing 12. Each module 14 includes at least one connector port 18 that can operably engage a corresponding connector plug for an electronic device such that electricity can be supplied to the electronic device through the connector port 18. The connector port 18 can comprise, but is not limited to a standard Type-A USB connector port, a micro USB connector port, a mini USB connector port, a FIREWIRE connector port, LIGHTNING connector port, an APPLE 30-pin connector port, miniature phone jack or other standard connectors capable of transferring electricity to a corresponding connector plug inserted into the connector port 18. In this configuration, the module 14 can operate as a power outlet remote from the main housing 12 of the power distribution unit 10 providing a more conveniently placed and lower profile power outlet.

As depicted in FIGS. 3A-3D, the power distribution unit 10 includes a wall plug 20 that can be operably engaged to an electrical socket of a wall outlet to draw electricity from the wall outlet. In an example, the wall plug 20 can comprise an electrical plug configured for interfacing with a standard electrical socket. The wall plug 20 is linked to power distribution circuitry positioned within the housing 12. The power distribution circuitry is configured to transfer at least portion of the electricity drawn from the wall outlet to the connector port 18 of the module 14. In at least one example, the power distribution unit 10 can include at least one electrical socket 22 mounted to the housing 12. In this configuration, as depicted, each electrical socket 22 comprises a standard electrical socket for interfacing with a standard electrical plug. In this configuration, the distribution circuitry is configured to distribute a portion of the electricity drawn from the wall outlet between the connector port 18 and each electrical socket 22 to supply electricity to electronic devices connected thereto.

As depicted in FIGS. 3A to 3D, in an example, the power distribution unit 10 includes power conditioning circuitry for altering the electricity received from the power distribution circuitry. The power conditioning circuitry can include, but are not limited to, converter, surge protection, noise filtration, voltage regulation, power isolation and combinations thereof. In an example, power conditioning circuitry having surge protection configured to limit the amplitude of the supplied electricity or cutoff the connector port 18 and/or each electrical socket 22 if irregular current is detected in the electricity supplied from the wall outlet. The power conditioning circuitry prevents the irregular current from damaging any electronic device connected to the connector port 18 or an electrical socket 22. In an example, power conditioning circuitry having converter circuitry converts the supplied AC current to DC current that is compatible with the electronic device. In certain examples, the power conditioning circuitry for the electrical sockets provide surge protection for the electrical sockets, but does not convert the current from AC current to DC current as depicted in FIGS. 3A to 3D.

Figure 3A:
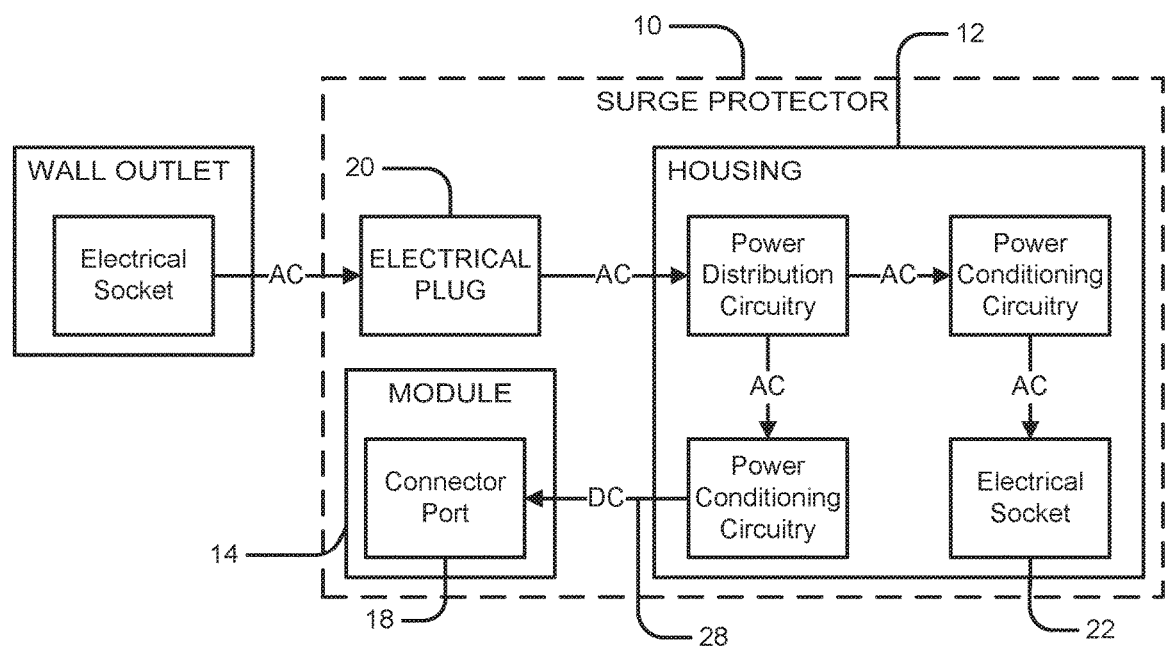
FIG. 3A is a schematic view of a surge protector according to an example.

As depicted in FIG. 3A, in an example, the power distribution circuitry and power conditioning circuitry are positioned within the housing 12. In this configuration, the electricity reaching the module 14 has already been conditioned and converted to DC current.

Figure 3B:
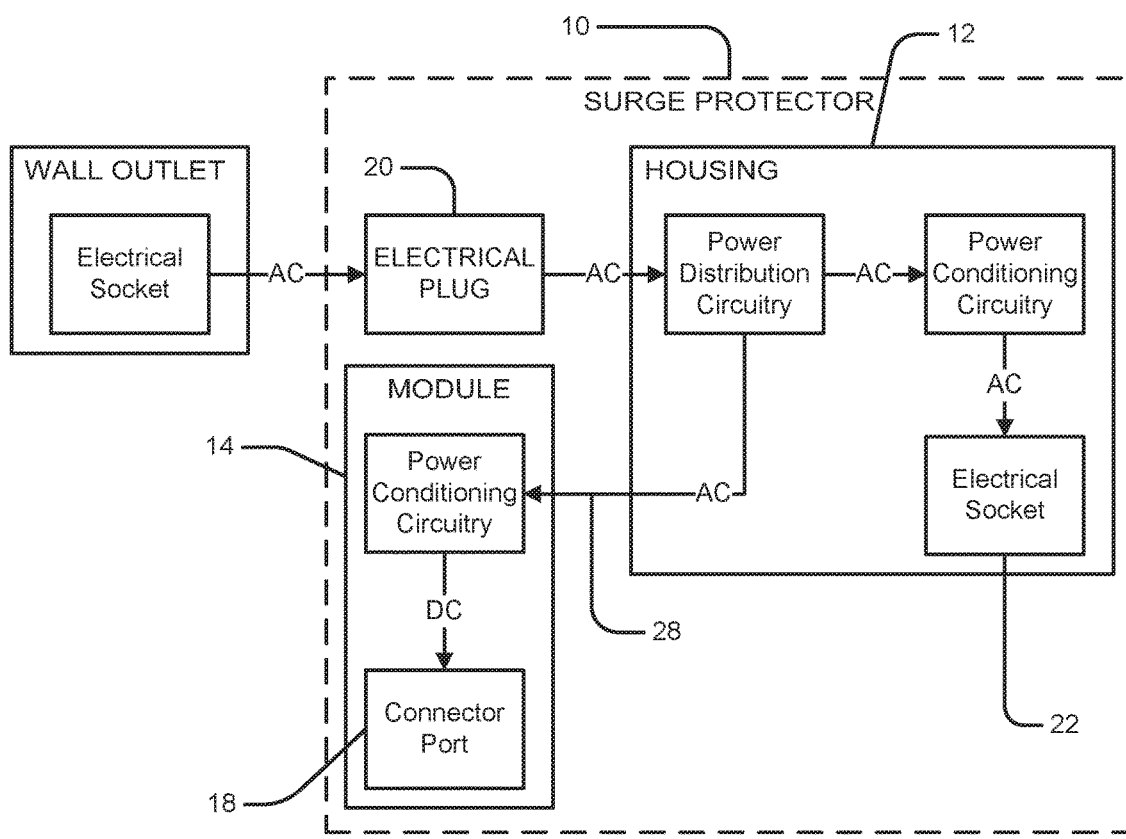
FIG. 3B is a schematic view of a surge protector according to an example.

As depicted in FIG. 3B, in an example, the power distribution circuitry is positioned within the housing 12 and the power conditioning circuitry for the module 14 is positioned within the module 14. In this configuration, the electricity diverted to the module 14 by the power distribution circuitry is converted and conditioned at the module 14.

Figure 3C:
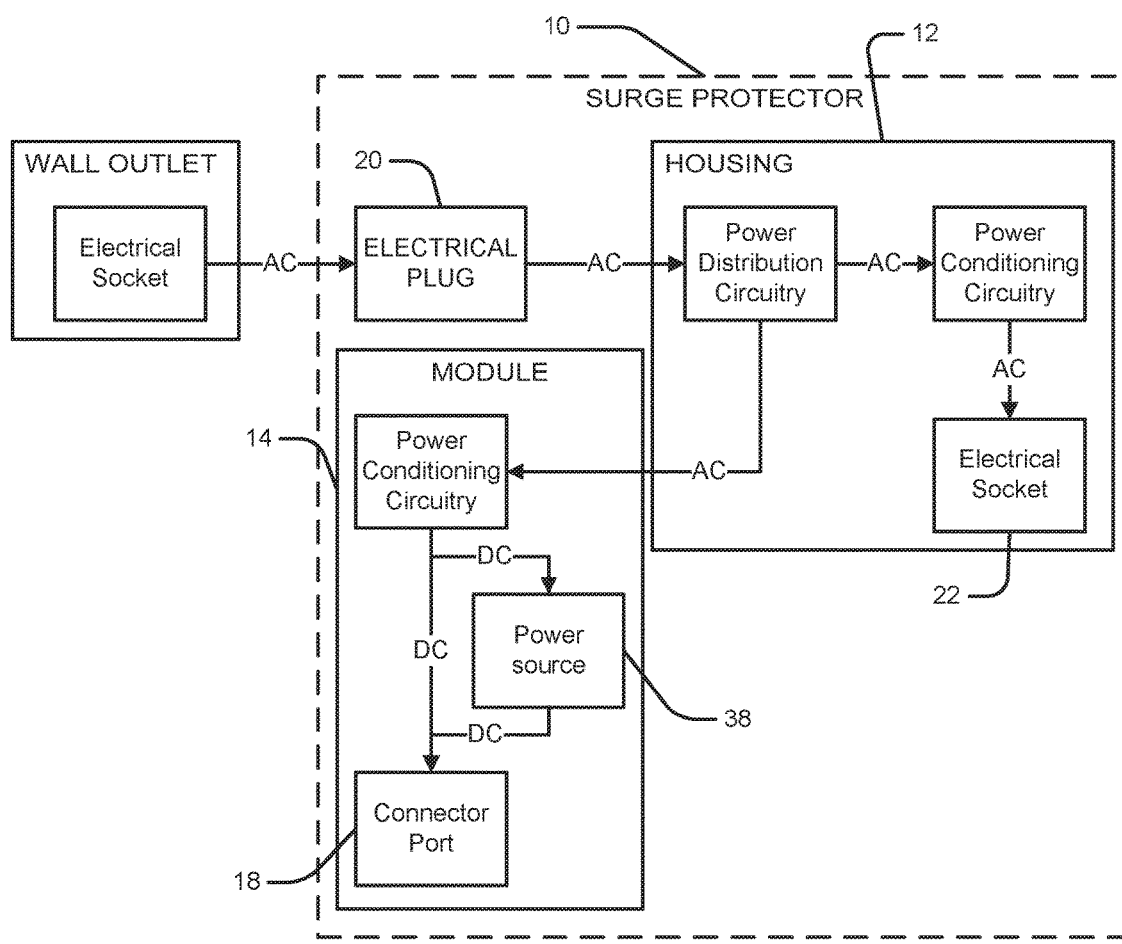
FIG. 3C is a schematic view of a surge protector according to an example.
Figure 3D:
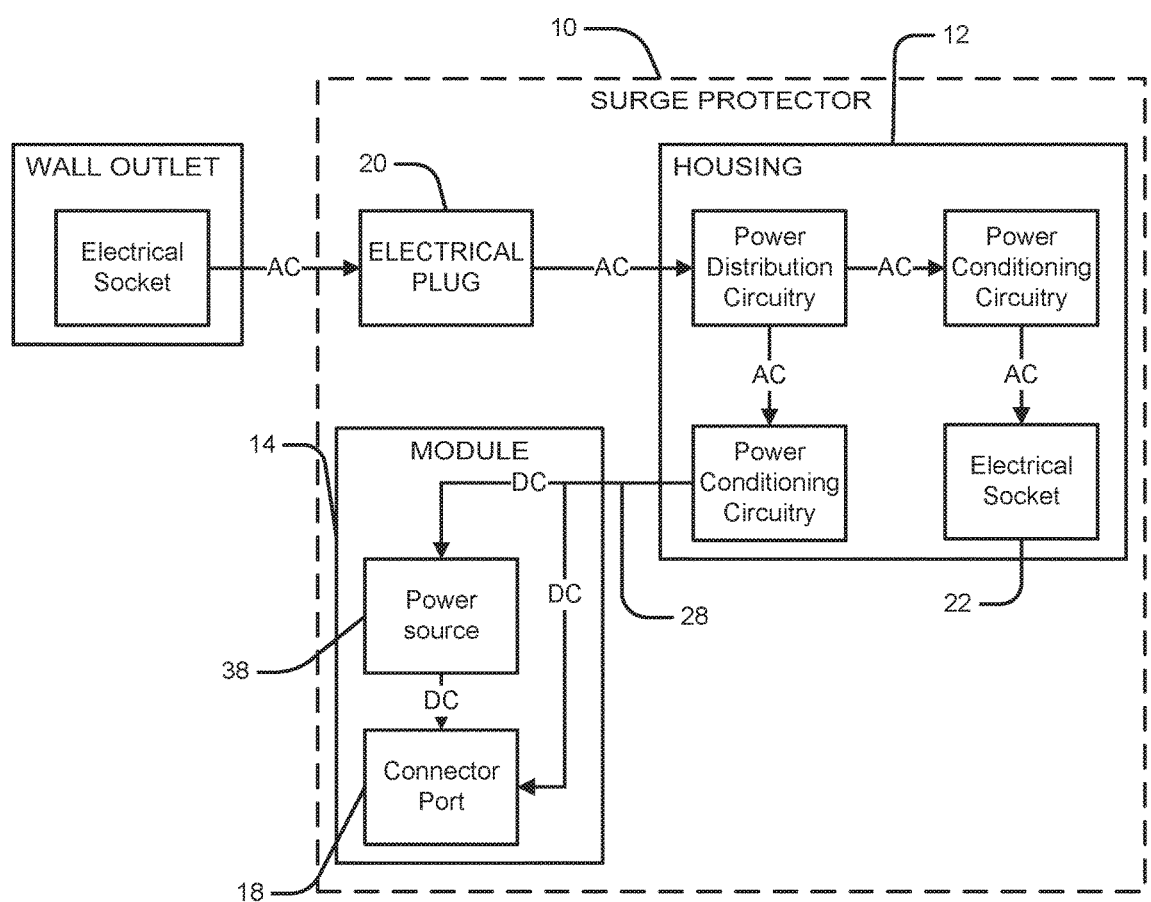
FIG. 3D is a schematic view of a surge protector according to an example.
Figure 4:
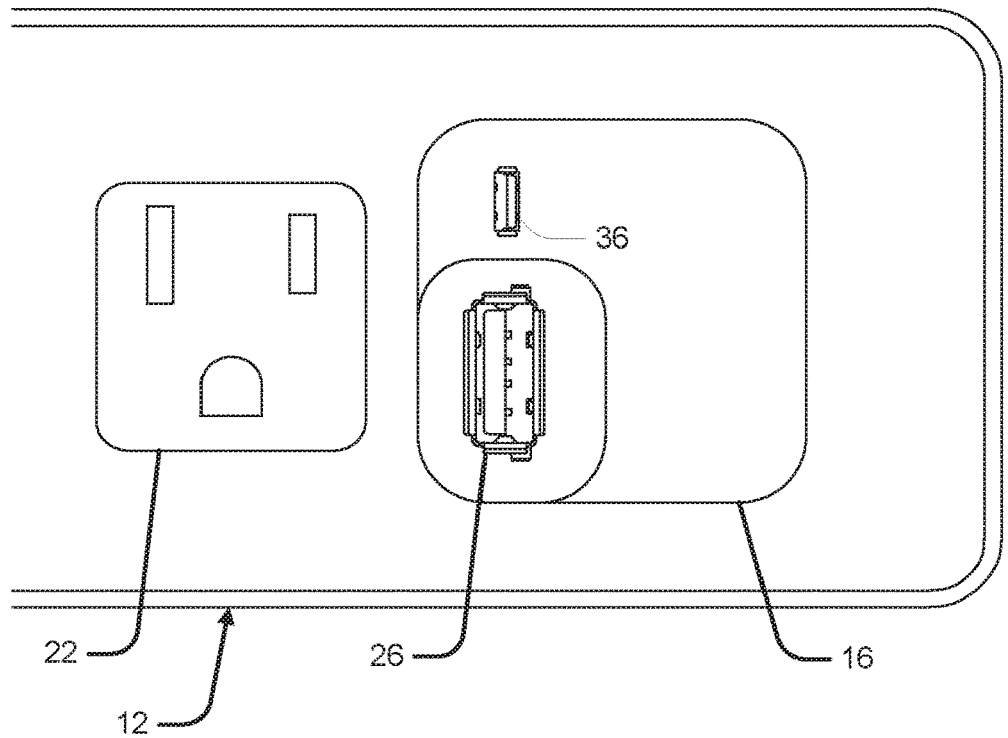
FIG. 4 is a top view of a module slot of a surge protector for receiving a removable module according to an example.

As depicted in FIGS. 3C-3D, in an example, the module 14 includes a power source 38 for supplying electricity to an electronic device connected to the connector port 18. In this configuration, the power source 38 is adapted to provide electricity to the electronic device if the connection between the module 14 and the housing 12 is interrupted. As depicted in FIG. 3C, in an example, the power conditioning circuitry can be positioned at the module 14 to convert the electricity and provide surge protection to the connector port 18 and the power source 38 at the module 14. As depicted in FIG. 3D, in an example, the power conditioning circuitry can be positioned at the housing 12 to convert the electricity and provide surge protection to the connector port 18 and the power source 38 at the housing 12 before providing the converted electricity to the module 14. In an example, the power source 38 includes a rechargeable battery that can be charged when the module 14 is operably connected to the power distribution circuitry and the wall plug 20 is connected to a wall outlet. In certain examples, the module 14 includes bypass circuitry that directly transmits electricity to the connector 18 from the housing 12 when the wall plug 20 is connected to the wall outlet and the power source 38 is fully charged.

In an example, the module 14 includes at least one visual indicator comprising, but not limited to, lighting and audio alarms for indicating when the module 14 is connected to the housing 12 either directly or via cable 28. In other examples, the indicator can signal when the connector 18 is being powered with electricity supplied by the power source 38 or the wall outlet. In yet other examples, the indicator can signal when the power source 38 is connected to the wall outlet and being charged.

As depicted in FIGS. 4-7, the module 14 includes a housing connector 24 and the housing 12 includes a corresponding module connector 26. The module connector 26 is positioned within the module slot 16 such that the housing connector 24 engages the module connector 26 when the module 14 is inserted into the module slot 16. As depicted, the housing connector 24 comprises a USB plug and the module connector 26 comprises a USB receptacle. In other examples, the housing connector 24 and the module connector 26 can include various conventional electrical connector plug and port pairs including, but not limited to USB, micro USB, mini USB, FIREWIRE, LIGHTNING, APPLE 30-pin or miniature phone jack connector systems.

As depicted in FIGS. 4-7, the power distribution unit 10 includes a cable 28 having a first cable connector 30 and a second cable connector 32. In an example, the first cable connector 30 is configured to connect to the housing connector 24. In this configuration, the second cable connector 32 is configured to connect to the module connector 26 to operably connect the module 14 to the power distribution circuitry.

Figure 5:
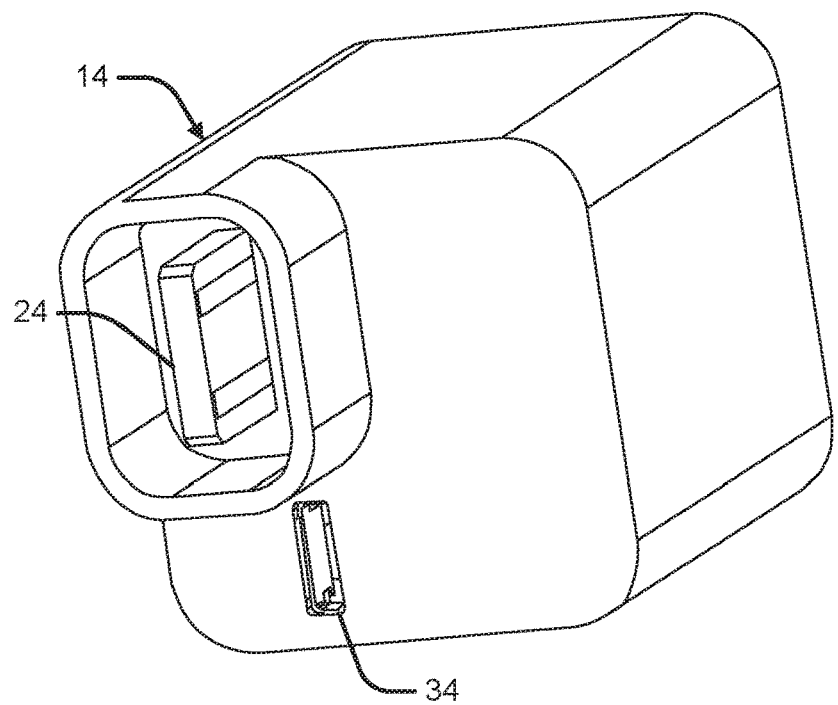
FIG. 5 is a bottom perspective view of a removable module according to an example.
Figure 6:
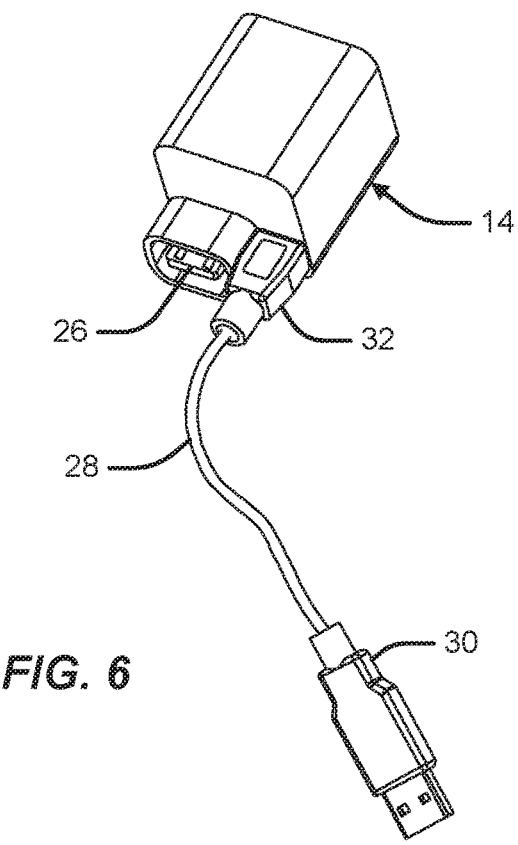
FIG. 6 is a perspective view of a removable module having a linkage connected to the removable module.

As depicted in FIG. 5, in certain examples, module 14 can also include a secondary housing connector 34. In this configuration, the first cable connector 30 is configured to connect to the secondary housing connector 34 to operably connect the module 14 to the power distribution circuitry. Similarly, in certain examples, the power housing 12 can include a secondary module connector 36. In this configuration, the second cable connector 32 is configured to connect to the secondary module connector 26 to operably connect the module 14 to the power distribution circuitry. As depicted, the secondary housing connector 34 and the secondary module connector 36 comprise micro USB connectors. In certain examples, the secondary module connector 36 comprises a micro USB port. In other examples, the housing connector 24 and the module connector 26 can include various conventional electrical connector plug and port pairs including, but not limited to USB, micro USB, mini USB, FIREWIRE, LIGHTNING, APPLE 30-pin or miniature phone jack connector systems.

In certain examples, one of the first or second cable connectors 30, 32 can be connected to one of the primary connectors 24, 26 and the other cable connector 30, 32 can be connected to one of the secondary connectors 34, 36. In at least one example, secondary module connector 36 is a micro USB port and the first cable connector 30 is a type-A USB plug for interfacing with module connector 24.

Figure 7:
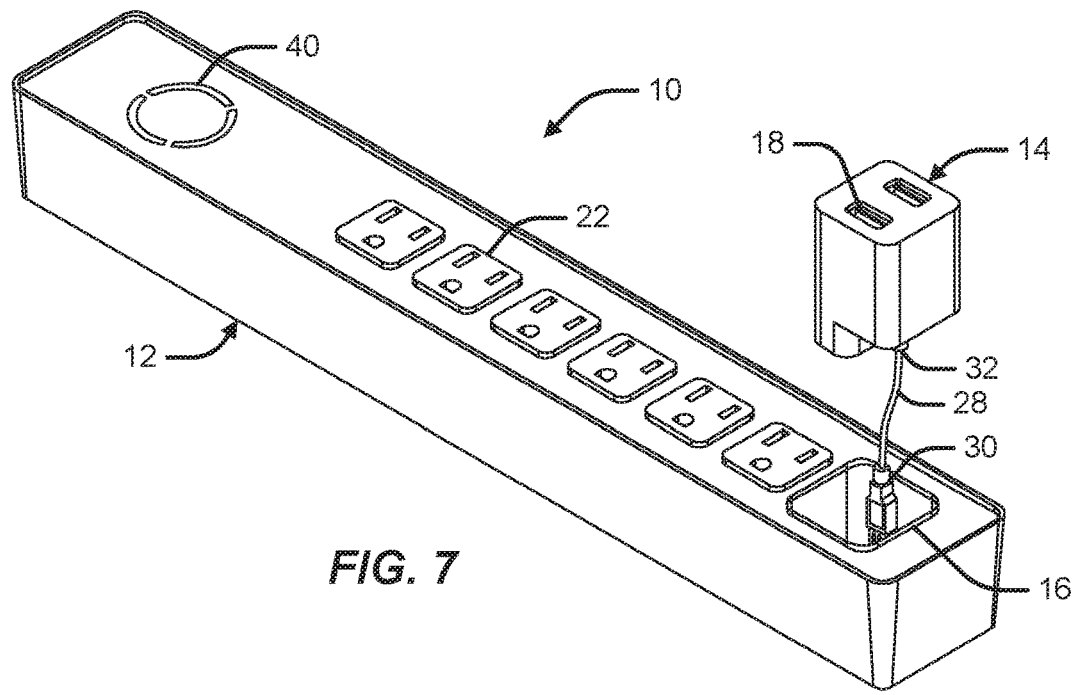
FIG. 7 is a perspective view of a surge protector having a housing for receiving a removable module according to an example in which the module is detached from the housing and operably connected to the housing by a linkage.

As depicted in FIGS. 1-2 and 7, in an example, the housing 12 can include at least one visual indicator 40 comprising, but not limited to, lighting and audio alarms for indicating when the module 14 is connected to the housing 12 either directly or via cable 28. In other examples, the indicator 40 can signal when the connector 18 is being powered with electricity supplied by the power source 38 or the wall outlet. In yet other examples, the indicator 40 can signal when the power source 38 is connected to the wall outlet and being charged.

As depicted in FIGS. 2 and 5-7, in an example, the module 14 can include a keyed protrusion 42 proximate the housing connector 24. In this configuration, the module slot 16 includes a keyed slot 44 corresponding to the shape of the keyed protrusion 42. In this configuration, the power distribution unit 10 can comprise a plurality of modules 14, the housing 12 defining a plurality of module slots 16 each corresponding to one of the plurality of modules 14. Each keyed protrusion 42 can comprise a unique shape mating the shape of the keyed slot 44 preventing insertion of the module 14 into the wrong module slot 16.

In certain examples, the housing 12 can include releasable locking features that can be positioned within the module slot 16. The locking features are configured to releasably engage the module 14 when inserted into the module slot 16 to prevent the module 14 from being inadvertently removed from the housing. The locking features can include, but are not limited to a detent assembly, a biasing arm assembly, a flexible hook assembly and other conventional arrangements for releasably engaging the module 14 within the module slot 16.

In an example, a method for providing a connector 18 for a power distribution unit 10 to which an electronic device can be connected, comprises providing a surge protector having a housing 12, at least one module 14 and a wall plug 20, wherein the housing 12 defines a housing slot 16 for receiving the module 14. The method further including operably connecting the wall plug 20 to power distribution circuitry positioned within the housing 12. The method also includes providing a cable 28 for operably connecting the module 14 to the power distribution circuitry within the housing 12 when the module 14 is removed from the housing slot 16 and positioned at a location remote from the housing 12.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments according to this disclosure. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including"

and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of this disclosure should be determined with reference to the appended claims, along with the full scope of equivalents to which such claims are entitled.

What is claimed is:

1. A power distribution unit for providing electricity to an electronic device, comprising:
    a housing defining a module slot and including at least one electrical socket and a module connector positioned within the module slot;
    a module including at least one connector port, the module receivable within the module slot and including a housing connector, wherein the housing connector operably connectable to the module connector when the module is inserted into the module slot; and
    a cable connectable to the module connector of the housing and the housing connector of the module to connect the housing to the module.

2. The power distribution unit of claim 1, further comprising:
    a power plug operably connectable to an electrical socket of an electrical outlet to draw electricity from the wall outlet, the power plug being operably connected to power distribution circuitry positioned within the housing to supply electricity from the wall outlet to the power distribution circuitry.

3. The power distribution unit of claim 2, further comprising:
    power conditioning circuitry configured to operably disconnect a connector port of the module from the wall plug when an irregularity is detected in the electricity drawn from the wall outlet.

4. The power distribution unit of claim 3, wherein the power conditioning circuitry is configured to operably disconnect the power plug from the electrical socket to interrupt the supply of electricity to the electrical socket from the power plug when an irregularity is detected in the electricity supply.

5. The power distribution unit of claim 3, wherein the connector port comprises a USB port.

6. The power distribution unit of claim 2, wherein the housing further comprises:
    at least one visual indicator;
    wherein the visual indicator is configured to visually indicate connection of the power plug to the electrical socket.

7. The power distribution unit of claim 1, further comprising:
    a plurality of modules each including at least one connector port;
    wherein the housing defines a plurality of module slots each corresponding to one of the plurality of modules.

8. The power distribution unit of claim 1, wherein the housing further comprises at least one of a serial connector, a telephone connector, and a USB connector.

9. A system for providing electricity to an electronic device, comprising:
    a housing defining a module slot and including a plurality of electrical sockets and a module connector positioned within the module slot;
    a module including at least one connector port and receivable within the module slot and including a housing connector, wherein the housing connector is operably connectable to the module connector when the module is inserted into the module slot; and
    a cable connectable to the module connector of the housing and the housing connector of the module to connect the housing to the module.

10. The system of claim 9, further comprising:
    a power plug operably connectable to an electrical socket of an electrical outlet to draw electricity from the wall outlet, the power plug being operably connected to power distribution circuitry positioned within the housing to supply electricity from the wall outlet to the power distribution circuitry.

11. The system of claim 10, further comprising:
    power conditioning circuitry configured to operably disconnect the connector port from the wall plug when an irregularity is detected in the electricity drawn from the wall outlet.

12. The system of claim 11, further comprising:
    wherein the power conditioning circuitry is configured to operably disconnect the power plug from each electrical socket to interrupt the supply of electricity to each electrical socket from the power plug when an irregularity is detected in the electricity supply.

13. The system of claim 9, wherein the connector port comprises a USB port.

14. The system of claim 9, further comprising:
    a plurality of modules each including at least one connector port;
    wherein the housing defines a plurality of module slots each corresponding to one of the plurality of modules.

15. The system of claim 9, wherein the housing further comprises at least one of a serial connector, a telephone connector, and a USB connector.

16. A method for providing electricity to an electronic device, comprising:
    connecting power distribution circuitry contained within a housing to an electrical socket, the housing defining a module slot and including a module connector positioned within the module slot;
    connecting a housing connector of a module to the module connector of the housing, the module including a connector port; and connecting the electronic device to the connector port of the module.

17. The method of claim 16, further comprising:
inserting the module into the module slot to directly connect the housing connector of the module to the module connector of the housing.

18. The method of claim 16, further comprising:
connecting a cable to the housing connector of the module and the module connector of the housing to connect the housing connector of the module to the module connector of the housing.

* * * * *